(12) United States Patent
Ballard

(10) Patent No.: US 10,081,755 B2
(45) Date of Patent: Sep. 25, 2018

(54) SET ON DEMAND CEMENT COMPOSITIONS FOR CURING FLUID LOSS

(71) Applicant: M-I DRILLING FLUIDS UK LIMITED, Aberdeen (GB)

(72) Inventor: David Ballard, Stonehaven (GB)

(73) Assignee: M-I Drilling Fluids UK Ltd, Aberdeen (GB)

( * ) Notice: Subject to any disclaimer, the term of this patent is extended or adjusted under 35 U.S.C. 154(b) by 34 days.

(21) Appl. No.: 14/758,764

(22) PCT Filed: Dec. 31, 2013

(86) PCT No.: PCT/EP2013/078162
§ 371 (c)(1),
(2) Date: Jun. 30, 2015

(87) PCT Pub. No.: WO2014/102386
PCT Pub. Date: Jul. 3, 2014

(65) Prior Publication Data
US 2015/0337194 A1    Nov. 26, 2015

Related U.S. Application Data

(60) Provisional application No. 61/747,821, filed on Dec. 31, 2012, provisional application No. 61/771,492, filed on Mar. 1, 2013.

(51) Int. Cl.
| | |
|---|---|
| *C04B 9/04* | (2006.01) |
| *C09K 8/42* | (2006.01) |
| *C09K 8/487* | (2006.01) |
| *E21B 33/14* | (2006.01) |
| *C09K 8/467* | (2006.01) |
| *C04B 28/32* | (2006.01) |

(52) U.S. Cl.
CPC ............. *C09K 8/487* (2013.01); *C04B 28/32* (2013.01); *C09K 8/426* (2013.01); *C09K 8/428* (2013.01); *C09K 8/467* (2013.01); *E21B 33/14* (2013.01); *Y02W 30/94* (2015.05)

(58) Field of Classification Search
CPC ..... C04B 14/066; C04B 18/146; C04B 20/10; C04B 24/02; C04B 24/163; C04B 24/243; C04B 24/2641; C04B 24/2652; C04B 24/2664; C04B 24/2688; C04B 40/0675; C04B 28/32; C04B 2103/10; C09K 8/426; C09K 8/428; C09K 8/467; C09K 8/487; E21B 33/14
See application file for complete search history.

(56) References Cited

U.S. PATENT DOCUMENTS

| | | | |
|---|---|---|---|
| 2,890,752 A | 6/1959 | Crone et al. | |
| 3,493,529 A * | 2/1970 | Eilers | C04B 28/065 166/293 |
| 3,917,771 A * | 11/1975 | Basile | C04B 28/04 106/778 |
| 4,487,529 A * | 12/1984 | Douty | E21D 20/021 106/713 |
| 5,348,584 A | 9/1994 | Brothers et al. | |
| 6,616,751 B1 * | 9/2003 | Maroy | C04B 24/00 106/696 |
| 7,044,222 B2 | 5/2006 | Tomlinson | |
| 7,246,665 B2 | 7/2007 | Almond et al. | |
| 7,350,576 B2 | 4/2008 | Robertson et al. | |
| 7,431,086 B2 | 10/2008 | Lewis et al. | |
| 8,167,998 B2 * | 5/2012 | Ladely (Guevara) | C04B 16/08 106/724 |
| 2005/0251149 A1 * | 11/2005 | Wenz | A61L 27/12 606/94 |
| 2008/0006404 A1 * | 1/2008 | Reddy | C04B 14/06 166/292 |
| 2008/0161522 A1 | 7/2008 | Riegel et al. | |
| 2008/0299093 A1 * | 12/2008 | Yang | A61L 24/0015 424/93.7 |
| 2009/0158964 A1 * | 6/2009 | Insley | A61L 24/02 106/691 |
| 2010/0016522 A1 | 1/2010 | Stueven et al. | |
| 2014/0076561 A1 * | 3/2014 | Reddy | C04B 28/32 166/293 |

FOREIGN PATENT DOCUMENTS

| | | | |
|---|---|---|---|
| GB | 1324411 A * | 7/1973 | |
| GB | 1324411 A | 7/1973 | |
| KR | 2010037979 A * | 4/2010 | |
| WO | 2008/084193 A2 | 7/2008 | |
| WO | WO2010/055483 A2 * | 5/2010 | |

OTHER PUBLICATIONS

International Search Report and Written Opinion for the equivalent International Patent Application No. PCT/EP2013/078162 dated Mar. 25, 2014 (13 pages).
Office Action for the equivalent Saudi Arabian Patent Application No. 51536005 dated Mar. 3, 2017, with partial English translation (11 pages).

* cited by examiner

*Primary Examiner* — Anthony J Green
(74) *Attorney, Agent, or Firm* — David J. Smith

(57) ABSTRACT

Cement compositions containing a cement component and an oil-immiscible solvent and methods for using same are provided. In another aspect, methods for sealing subterranean zones are provided that include emplacing a cement composition into a wellbore containing a cement component and an oil-immiscible solvent, contacting the cement composition with a water source, and reacting the cement composition with the water source to form a hardened cement.

27 Claims, 5 Drawing Sheets

SET ON DEMAND CEMENT COMPOSITIONS FOR CURING FLUID LOSS

BACKGROUND

During the drilling of a wellbore, various fluids are used in the well for a variety of functions. The fluids may be circulated through a drill pipe and drill bit into the wellbore and then may subsequently flow upward through wellbore to the surface. During this circulation, drilling fluids act to lubricate and cool rotary drill bits, to prevent blowouts by providing hydrostatic pressure to balance any high-pressure formation fluids that may suddenly enter the wellbore, and to remove cuttings from the wellbore.

Wellbore fluids may also be used to provide sufficient hydrostatic pressure in the well to prevent the influx and efflux of formation fluids and wellbore fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore may be maintained at a higher pressure than the pore pressure. While it is highly advantageous to maintain the wellbore pressures above the pore pressure, on the other hand, if the pressure exerted by the wellbore fluids exceeds the fracture resistance of the formation, a formation fracture and thus induced mud losses may occur. Further, with a formation fracture, when the wellbore fluid in the annulus flows into the fracture, the loss of wellbore fluid may cause the hydrostatic pressure in the wellbore to decrease, which may in turn also allow formation fluids to enter the wellbore. As a result, the formation fracture pressure may define an upper limit for allowable wellbore pressure in an open wellbore while the pore pressure defines a lower limit. Therefore, a major constraint on well design and selection of drilling fluids is the balance between varying pore pressures and formation fracture pressures or fracture gradients though the depth of the well.

One common step during the construction of the wellbore involves placing a pipe string, e.g., casing, into the wellbore. Well casings of various sizes may be used, depending upon depth, desired hole size, and geological formations encountered. The casing serves several functions, including providing structural support to the wellbore to prevent the formation walls from caving into the wellbore. The casing may, in some instances, be stabilized and bonded in position within the wellbore. However, because drilling fluids are generally not settable (i.e. they don't develop compressive strength or create a solid bond with casing and formation surfaces), a portion of the drilling fluid may be removed from the wellbore so that the casings may be set in place by a primary cementing operation. Primary cementing operations may fill at least a portion of the annular space between the casing and the formation wall with a hydraulic cement composition. The cement composition may then be allowed to solidify in the annular space, thereby forming an annular sheath of cement. The cement barrier is desirably impermeable, such that it will prevent the migration of fluid between zones or formations previously penetrated by the wellbore.

Cementing operations may also include use of cement during remediation of lost circulation or zonal isolation. Lost circulation is a recurring drilling problem, characterized by loss of drilling mud into downhole formations. However, other fluids, besides "drilling fluid" can potentially be lost, including completion, drill-in, production fluid, etc. Lost circulation can occur naturally in formations that are fractured, highly permeable, porous, cavernous, or vugular. Lost circulation may also result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure effectively weakens a wellbore through permeable, potentially hydrocarbon-bearing rock formation, but neighboring or inter-bedded low permeability rocks, such as shales, maintain their pore pressure. This can make the drilling of certain depleted zones impossible because the mud weight required to support the shale exceeds the fracture resistance of the sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result. In such operations, a cement slurry may be forced under pressure to areas of lost integrity in the annulus to seal off those areas.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

Before cementing operations commence, engineers determine the volume of cement (commonly with the help of a caliper log) to be placed in the wellbore and the physical properties of both the slurry and the set cement needed, including density and viscosity.

SUMMARY

In one aspect, embodiments disclosed herein relate to cement compositions containing a cement component; and an oil-immiscible solvent, wherein the cement composition is substantially free of water.

In another aspect, embodiments disclosed herein relate to methods for sealing subterranean zones that include: emplacing a cement composition into a wellbore containing a cement component and an oil-immiscible solvent; contacting the cement composition with a formation water; and reacting the cement composition with the formation water to form a hardened cement.

In yet another aspect, embodiments disclosed herein relate to methods for sealing subterranean zones that include emplacing a cement composition into a wellbore containing a cement component, an oil-immiscible solvent, and a latent curing agent; releasing an aqueous fluid stored in the latent curing agent; and reacting the cement composition with the aqueous fluid released from the latent curing agent to form a hardened cement.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
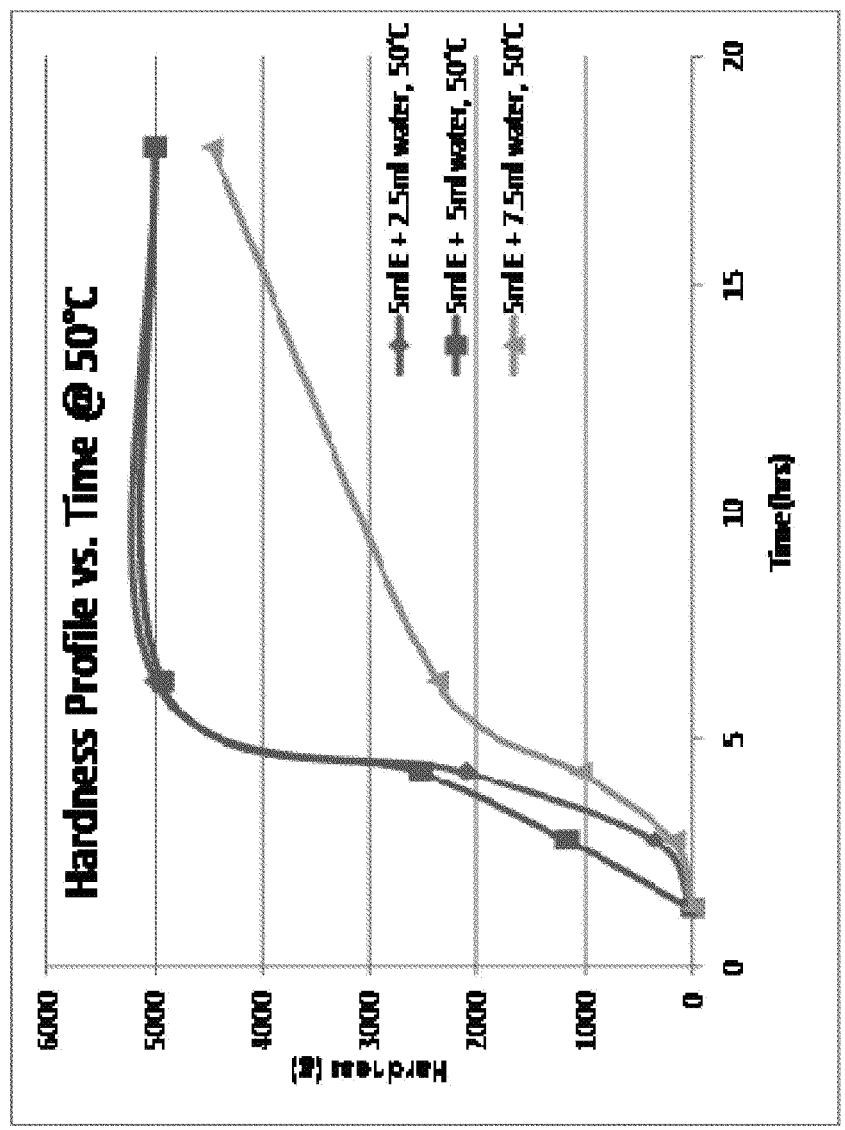
FIG. 1 is an illustration of the hardness profile as a function of applied water for cement compositions in accordance with embodiments described herein.

In one aspect, embodiments disclosed herein relate to set on demand compositions that may be used for cementing applications, including primary cementing operations, lost circulation, and zonal isolation, etc. In one or more embodiments, a cement composition containing a cement component that hardens or sets when exposed to water is suspended in a non-aqueous solvent or combination of non-aqueous solvents. Because the solvent is non-aqueous, hydration of the cement component is suspended or delayed, which may allow cement compositions to penetrate weakly consolidated formations and crevices before curing or setting. Once in place, the presence of increased temperature and aqueous fluids cause the cement component of the composition to hydrate and set. Cement compositions disclosed herein may enable better control during cementing operations such as primary cementing and spot or squeeze treatments.

Cement Components

In one or more embodiments, cement compositions disclosed herein may include a cement component that reacts with a downhole water source and hardens to form a barrier that prevents the flow of gases or liquids within a wellbore traversing an oil or gas reservoir.

In a particular embodiment, cement compositions may incorporate a magnesium-based cement such as a "Sorel" cement. Magnesium-based cements are fast setting cements that approach maximum strength within 24 hours of contact with water. While not limited by any particular theory, the cement-forming reaction mechanism is thought to be an acid-base reaction between a magnesium oxide, such as MgO, and available aqueous salts. For example, mixing solid MgO and a brine containing $MgCl_2$ results in an initial gel formation followed by the crystallization of the gel into an insoluble cement matrix, producing magnesium oxychloride (MOC) cement. Other magnesium-based cements may be formed from the reaction of magnesium cations and a number of counter anions such as, for example, halides, phosphates, sulfates, silicates, aluminosilicates, borates, and carbonates. In some embodiments, anions may be provided by a magnesium salt of the selected anion.

In addition to MOC cements, prominent examples of magnesium-based cements also include magnesium oxysulfate (MOS) cements formed by the combination of magnesium oxide and a magnesium sulfate solution), and magnesium phosphate (MOP) cements formed by the reaction between magnesium oxide and a soluble phosphate salt, such as ammonium phosphate ($NH_4H_2PO_4$). Other suitable magnesium cements may also include magnesium carbonate and magnesium silicate cements. In one or more embodiments, magnesium cements may also include combinations of any magnesium cements described herein and those known in the art.

In other embodiments, the cement composition may be selected from hydraulic cements known in the art, such as those containing compounds of calcium, aluminum, silicon, oxygen and/or sulfur, which set and harden by reaction with water. These include "Portland cements," such as normal Portland or rapid-hardening Portland cement, sulfate-resisting cement, and other modified Portland cements; high-alumina cements, high-alumina calcium-aluminate cements; and the same cements further containing small quantities of accelerators or retarders or air-entraining agents. Other cements may include phosphate cements and Portland cements containing secondary constituents such as fly ash, pozzolan, and the like. Other water-sensitive cements may contain aluminosilicates and silicates that include ASTM Class C fly ash, ASTM Class F fly ash, ground blast furnace slag, calcined clays, partially calcined clays (e.g., metakaolin), silica fume containing aluminum, natural aluminosilicate, feldspars, dehydrated feldspars, alumina and silica sols, synthetic aluminosilicate glass powder, zeolite, scoria, allophone, bentonite and pumice.

In one or more embodiments, the set time of the cement composition may be controlled by, for example, varying the grain size of the cement components, varying the temperature of the composition, or modifying the availability of the water from a selected water source. In other embodiments, the exothermic reaction of components included in the cement composition (e.g., magnesium oxide, calcium oxide) may be used to increase the temperature of the cement composition and thereby increase the rate of setting or hardening of the composition.

Cement compositions may also include a variety of inorganic and organic aggregates, such as saw dust, wood flour, marble flour, sand, glass fibers, mineral fibers, and gravel. In some embodiments, a cement component may be used in conjunction with set retarders known in the art to increase the workable set time of the cement. Examples of retarders known in the art include organophosphates, amine phosphonic acids, lignosulfate salts, hydroxycarboxylic acids, carbohydrates, borax, sodium pentaborate, sodium tetraborate, or boric acid, and proteins such as whey protein.

In one or more embodiments, cement compositions in accordance with this disclosure may contain a cement component at a percent by weight (wt %) concentration having a lower limit equal or greater than 5 wt %, 7 wt %, 10 wt %, and 15 wt %, to an upper limit of 15 wt %, 20 wt %, 30 wt %, 50 wt %, and 60 wt %, where the wt % concentration of cement component, or combinations thereof, may range from any lower limit to any upper limit.

In one or more embodiments, cement compositions in accordance with the present disclosure may be substantially or completely free of surfactants and emulsifiers. In other embodiments, cement compositions may also contain retarders and viscosifiers known in the art of cement setting inhibition.

In one or more embodiments, cement compositions (as emplaced in the well) in accordance with this disclosure are substantially free of water (or accessible water). In other embodiments, cement compositions in accordance with this disclosure contain less than 15% water by volume, or less than 10%, 5%, 3%, or 2% water in yet other embodiments.

Non-Aqueous Solvent System

In one or more embodiments, the suspension of the cement composition in a non-aqueous solvent may allow for control of the set time of the cement composition such that the cement composition is able to permeate into formation and react with water present in formation fractures and pores.

Non-aqueous solvents in accordance with the present disclosure include low molecular weight polar solvents that are immiscible in oil and, in particular embodiments, immiscible in mineral oils and diesel. In one or more embodiments, the non-aqueous solvent may be selected from, for example, glycol-derived compounds such as monoethylene glycol, diethylene glycol, diethylene glycol monomethyl ether, diethylene glycol monoethyl ether, glycerol, triethylene glycol, and the like. In some embodiments, the viscosity of a non-aqueous solvent such as those listed above may be modified through combination with a one or more low molecular weight alcohols that include methanol, ethanol, propanol, isopropanol, isobutanol, butanol, and the like, to aid in dispersion of materials into the non-aqueous solvent and to increase pumpability of the cementing composition.

In one or more embodiments, cement compositions in accordance with this disclosure may contain one or more non-aqueous solvents at a percent by volume (vol %) concentration having a lower limit equal or greater than 10 vol %, 20 vol %, 25 vol %, 30 vol %, 40 vol %, and 50 vol %, to an upper limit of 35 vol %, 50 vol %, 60 vol %, 70 vol %, and 80 vol %, where the vol % concentration of the non-aqueous solvent, or combinations thereof, may range from any lower limit to any upper limit.

Particulate Silica

Cement compositions of the present disclosure may also include a particulate silica additive. The methods used to prepare particulate silicas may alter many of the morphological characteristics of the final particulate silica product. For example, particulate silicas that may be used in cement compositions in accordance with the present disclosure include fumed or pyrogenic silicas, which are non-porous, water-insoluble, have a low bulk density, high surface area, and are compatible with aqueous and invert emulsion fluid systems.

In some embodiments, the surface of the silica particles (including fumed and/or precipitated silica) may be chemically modified by a number of synthetic techniques. Surface functionality of the particles may be tailored to improve solubility, dispersibility, or introduce reactive functional groups, such as to create a hydrophobic coating thereon. This may be achieved by reacting the precipitated silica particles with organosilanes or siloxanes, in which reactive silane groups present on the molecule may become covalently bound to the silica lattice that makes up the particles. Non-limiting examples of compounds that may be used to functionalize the surface of the precipitated silica particles include aminoalkylsilanes such as aminopropyltriethoxysilane, aminomethyltriethoxysilane, trimethoxy[3-(phenylamino)propyl]silane, and trimethyl[3-(triethoxysilyl)propyl]ammonium chloride; alkoxyorganomercaptosilanes such as bis(3-(triethoxysilylpropyl) tetrasulfide, bis(3-(triethoxysilylpropyl) disulfide, vinyltrimethoxy silane, vinyltriethoxy silane, 3-mercaptopropyltrimethoxysilane; 3-mercaptopropyltriethoxy silane; 3-aminopropyltrietho xysilane and 3-aminopropyltrimethoxysilane; and alkoxysilanes.

In other embodiment, organo-silicon materials that contain reactive end groups may be covalently linked to the surface of the silica particles. Reactive polysiloxanes may include, for example, diethyl dichlorosilane, phenyl ethyl diethoxy silane, methyl phenyl dichlorosilane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisilo xane, hexaethyldisiloxane, dimethyl dichlorosilane, dimethyl dimethoxy silane, dimethyl diethoxysilane, polydimethylsiloxanes comprising 3 to 200 dimethylsiloxy units, trimethyl siloxy or hydroxydimethylsiloxy end blocked poly(dimethylsiloxane) polymers (silicone oils) having an apparent viscosity within the range of from 1 to 1000 mPascals at 25° C., vinyl silane, gamm-methacryloxypropyl trimethoxy silane, polysiloxanes, e.g., polysiloxane spheres, and mixtures of such organo-silicone materials.

Particulate silicas may also be selected from precipitated silicas prepared, for example, from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The choice of agitation, duration of precipitation, the addition rate of reactants, temperature, concentration, and pH may vary the properties of the resulting silica particles. Other types of particulate silica include ground silicas or silica flour produced by grinding or cocomminution of a silica with a pin mill or an air-jet mill.

In some embodiments, particulate silicas suitable for incorporation into cement compositions in accordance with embodiments disclosed herein may be selected from commercially available silicas that include AEROSIL® COK 84, AEROSIL® 200, all of which are commercially available from Evonik Degussa Corporation (Piscataway, N.J.); and D66 and D30 ground silicas from Schlumberger (Houston, Tex.).

Particulate silicas useful in embodiments herein may include finely-divided particulate solid materials, such as powders, silts, or sands, as well as reinforced flocs or agglomerates of smaller particles of siliceous material. In some embodiments, the particulate silica (or agglomerates thereof) may have an average particle size ($D_{50}$) of less than 100 microns; less than 50 microns in other embodiments; and in the range from about 1 micron to about 40 microns, such as about 25 to about 35 microns, in yet other embodiments. In still other embodiments, the average particle size for particulate silicas can vary from 10 nm to 150 nm; or 20 to 100 nm. Particulate silicas having a larger initial average particle size may be used, where shear or other conditions may result in comminution of the particles, such as breaking up of agglomerates, resulting in a silica particle having a useful average particle size.

In one or more embodiments, cement compositions in accordance with this disclosure may contain a particulate silica at a percent by weight (wt %) concentration having a lower limit equal or greater than 0.01 wt %, 0.05 wt %, 0.1 wt %, 0.5 wt %, 1 wt %, and 5 wt %, to an upper limit of 0.5 wt %, 1 wt %, 5 wt %, 7 wt %, and 10 wt %, where the wt % concentration of particulate silica, or combinations thereof, may range from any lower limit to any upper limit.

Ionic Polymers

In embodiments of the present disclosure, ionic polymers may be added to provide additional strength and stability to the cement composition. Before the cement cures, ionic polymers may coat the surfaces of pre-cement particles present in the cement composition, decreasing the tendency of these particles to flocculate and settle and increasing overall dispersibility. During curing, ionic polymers may react with multivalent cations present in the cement composition or formation waters to form inter- and intra-strand crosslinks that incorporate with the forming cement, resulting in harder and more durable cement.

In one or more embodiments, the ionic polymer additive may be selected from polymers, copolymers, block copolymers, and higher order polymers (e.g., terpolymers, quaternary polymers, etc.) that are composed of one or more ionic monomers selected from alkenoic acids such as acrylic acid, itaconic acid and maleic acid; sulfonated monomers such as acrylamido-2-methyl-propane sulfonic acid, styrene sulfonic acid; phosphorylated monomers such as vinyl phosphonic acid, (1-amino-2-propenyl)phosphonic acid, styrene phosphonic acid, vinyl benzyl phosphonate; other water-miscible or water-soluble acrylates and methacrylates such as 2-hydroxyethyl methacrylate, hydroxymethyl methacrylate, 2-hydroxypropyl methacrylate, tetrahydrofurfuryl methacrylate, glycerol mono- or di-methacrylate, trimethylol propane trimethacrylate, ethylene glycol dimethacrylate, polyethylene glycol dimethacrylate, urethane methacrylates, alkyl acrylates, and the like. Other non-ionic monomers that may be incorporated as comonomers with any of the above ionic monomers include, but are not limited to, ethylene, propylene, styrene, alphamethyl styrene, t-butylstyene, p-methylstyrene, acrylamide, methacrylamide, methylene bis-acrylamide, diacetone acrylamide, diacetone methacrylamide, and the like. In particular embodiments, the ionic polymer may be an ionomer such as CARBOSPERSE™ polymers commercially available from Lubrizol (Wickliffe, Ohio), VERSAFLEX® Si from Akzo Nobel (Chicago, Ill.), ACUMER® 5000 from Dow Chemical Company (Ringgold, La.), and FLOSPERSE® available from SNF S.A.S. (Andrezieux, FRANCE).

In one or more embodiments, cement compositions in accordance with this disclosure may contain an ionic polymer additive at a percent by weight (wt %) concentration having a lower limit equal or greater than 0.5 wt %, 1 wt %, 1.5 wt %, 2.5 wt %, 3 wt %, and 5 wt %, to an upper limit of 0.75 wt %, 1 wt %, 3 wt %, 5 wt %, 7 wt %, and 10 wt %, where the wt % concentration of ionic polymer additive, or combinations thereof, may range from any lower limit to any upper limit.

In one or more embodiments, cement compositions in accordance with this disclosure may contain an ionic polymer additive having a molecular weight having a lower limit equal or greater than 0.5 kDa, 1 kDa, 2.5 kDa, 5 kDa, 15 kDa, and 30 kDa to an upper limit of 5 kDa, 7 kDa, 10 kDa, 15 kDa, 25 kDa, and 50 kDa where the molecular weight of ionic polymer additive, or combinations thereof, may range from any lower limit to any upper limit.

In one or more embodiments, cement compositions in accordance with this disclosure may contain a polyvinylpyrrolidone that is optionally crosslinked to a water insoluble, swellable material either in the course of vinylpyrrolidone polymerization, by addition of a multifunctional comonomer or by post-reaction, such as through hydrogen abstraction chemistry. While polyvinylpyrrolidone is not an ionic polymer, but is rather non-ionic, the polarity of polyvinylpyrrolidone may allow it to form complexes with hydrogen donors, such as phenols and carboxylic acids, as well inorganic salts that may be present in the cement composition. Further, it is also within the scope of the present disclosure that other non-ionic, but polar polymers may be used.

Additives

The fluids of the present invention may further contain additional chemicals depending upon the end use of the invert emulsion. For example, organophilic clays, viscosifiers, rheological modifiers, weighting agents, and bridging agents may be added to the fluid compositions of this invention for additional functional properties. The addition of such agents should be well known to one of skill in the art of formulating drilling fluids and muds. However, it should be noted that the addition of such agents should not adversely interfere with the properties associated with the cement composition's ability to solidify as described herein.

Organophilic clays, such as amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight is a sufficient range for most applications. VG-69™ and VG-PLUS™ are organoclay materials distributed by M-I L.L.C., and Versa-HRP™ is a polyamide resin material manufactured and distributed by M-I L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Weighting agents may be added to result in a drilling fluid density of up to about 24 pounds per gallon. The weight material is preferably added up to 21 pounds per gallon and most preferably up to 19.5 pounds per gallon.

Latent Curing Agents

In one or more embodiments, a latent curing agent may be added to the cement compositions of the present disclosure. Latent curing agents present in the cement compositions may include microscale and nanoscale organic or inorganic structures that are capable of sequestering aqueous fluids or other materials that may act to decrease the setting time of the concrete component. In some embodiments, latent curing agents include aqueous fluids encapsulated in an organic coating or contained within an inorganic material that releases stored fluids through passive diffusion into the surrounding media with a slow or rapid release profile. Because the aqueous fluid is sequestered (and unavailable to react with the cement for at least a period of time), a fluid including latent curing agent may still be considered substantially free of accessible water.

In another embodiment, aqueous fluids and curing agents may be released from an organic coating in response to an external stimulus or triggering event, which may include changes in temperature or pH; degradation of the encapsulant by enzymes, oxidants, or solvents; or physical disruption of the encapsulant, such as by grinding or crushing. It is also envisioned that encapsulants susceptible to triggered release may also be used in conjunction with passive diffusion encapsulants, and combined with any of the strategies disclosed above.

In one or more embodiments, the organic coating present on the latent curing source may be prepared from cellulose acetate, cellulose acetate butyrate, ethyl cellulose, hydroxymethyl cellulose, hydroxyethyl cellulose, and the like. Other encapsulants include polystyrene, copolymers of polystyrene with other vinylic monomers, polymethylmethacrylate, copolymers of methylmethacrylate with other ethylenically-unsaturated monomers, acrylic resins, polyolefins, polyamides, polycarbonates, polystyrene, vinyl polymers such as vinyl acetate, vinyl alcohol, vinyl chloride, vinyl butyral, and copolymers, terpolymers, and quaternary polymers thereof. Examples of pH-sensitive polymers include poly(hydroxethyl)methacrylate-co-methacrylic acid) and a copolymer of N,N,dimethylaminoethyl methacrylate and divinyl benzene.

In other embodiments, latent curing agents may be inorganic molecules or compounds that reversibly trap aqueous materials within a macromolecular structure such as a molecular sieve, hydrated salt, or silica gel. When added to cement compositions of the present disclosure, aqueous fluids trapped within the structure of the latent curing agent are released at a controlled rate. For example, increased temperature may drive trapped aqueous fluids from silica gel, molecular sieves, zeolites, and other materials known in the art. In yet other embodiments, the latent curing agent may be an absorbent polymer that releases trapped water in response to changes temperature or pH, where suitable examples include the polymeric particles described in U.S. Patent Pubs. 2008/0161522 and 2010/0016522.

Applications

In one or more embodiments, cement compositions disclosed herein may be used in any cementing application known in the art including, but not limited to, primary cementing, zonal isolation, cement squeezes, fluid loss pills, and the like. When used in primary cementing operations, cement compositions of the present disclosure may be placed in at least a portion of the annular space between the sidewalls of a wellbore and the exterior of a casing string disposed in the wellbore. The cement composition may then be allowed to solidify therein. The cement composition may be placed in the annular space either before or after a wellbore fluid is placed in the annular space. In some embodiments, a wellbore or annular space within the wellbore may be preflushed or overflushed with an aqueous wellbore fluid such as water, seawater, or brine prior to or following emplacement of the cement forming composition.

Those skilled in the art will appreciate that the disclosed methods and uses may not necessarily be applied throughout the entire length of the subterranean interval being cemented. In such cases, more than one cement composition may be placed sequentially. Those skilled in the art will also appreciate that the disclosed method and use would not only be useful for primary cementing, but also for remedial and other cementing operations such as squeeze cementing, plug cementing, and spot cementing. In such cementing operations, cement compositions may be positioned in the wellbore to minimize fluid loss into the formation, plug a void or crack in wellbore piping, or to repair a cement sheath residing in a wellbore annulus.

In some embodiments, emplacement of the cement composition occurs by pumping the cement composition through the casing string to fill the annular space or by pumping the cement into the desired wellbore region. However, emplacement of the cement composition may or may not involve pumping the cement composition. In some embodiments, placement of the cement composition may be achieved using wireline tools, slickline tools, dump bailers, and other methods and instrumentation well known in the art. Depending on the particular application, a cement formulation of the present disclosure may be directly emplaced into the wellbore by conventional means known in the art into the region of the wellbore in which the cement is desired to cure or set into the composite. Alternatively, the cement may be emplaced into a wellbore and then displaced into the region of the wellbore in which the cement is desired to set or cure.

According to various embodiments, the formulations of the present disclosure may be used where a casing string or another liner is to be sealed and/or bonded in the annular space between the walls of the borehole and the outer diameter of the casing or liner with composite material of the present disclosure. For example, following drilling of a given interval, once placement of a casing or liner is desired, the drilling fluid may be displaced by a displacement fluid. The drill bit and drill string may be pulled from the well and a casing or liner string may be suspended therein. The present formulation of components may be pumped through the interior of the casing or liner, and following the present fluid formulation, a second displacement fluid (for example, the fluid with which the next interval will be drilled or a fluid similar to the first displacement fluid) may displace the present fluid into the annulus between the casing or liner and borehole wall. Once the cement has cured and set in the annular space, drilling of the next interval may continue. Prior to production, the interior of the casing or liner may be cleaned and perforated, as known in the art of completing a wellbore. Alternatively, the formulations may be pumped into a selected region of the wellbore needing consolidation, strengthening, etc., and following curing, a central bore may be drilled out.

Further, in embodiments, a casing may be run into the hole having a fluid therein, followed by pumping a sequence of a spacer fluid ahead of a cement formulation according to the present disclosure, after which a displacement fluid may displace the formulation into the annulus. Further embodiments may use both a cementious slurry and a resin formulation (pumped in either order, cement then resin or resin then cement) and/or multiple volumes of cement and resin, such as cement-resin-cement or resin-cement-resin, with appropriate placement of spacers and/or wiper plugs. When using both cement and a resin formulation, different setting times between the cement and resin formulation may be used so that the resin may be set in compression or the resin may be set while the cement is still fluid.

Wellbore stability may also be enhanced by the injection of the cement formulation into formations along the wellbore. The mixture may then react or continue to react, strengthening the formation along the wellbore upon reaction of the cement with water.

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through only a small percentage of the volume of the reservoir, for example, and may thus require an excessive amount of treatment fluid to displace a high percentage of crude oil from a reservoir.

To combat the thief zones or high permeability zones of a formation, embodiments of the cement formulations disclosed herein may be injected into the formation. The cement formulation injected into the formation may react and partially or wholly restrict flow through the highly conductive zones. In this manner, the cement may effectively reduce channeling routes through the formation, forcing the treating fluid through less porous zones, and potentially decreasing the quantity of treating fluid required and increasing the oil recovery from the reservoir.

In other embodiments, the cement of the present disclosure may be formed within the formation to combat the thief zones. The cement formulation may be injected into the formation, allowing the components to penetrate further into the formation than if a water was injected with the formulation. By reacting the cement in situ in the formation, it may be possible to avert channeling that may have otherwise occurred further into the formation, such as where the treatment fluid traverses back to the thief zone soon after bypassing the injected gels as described above.

As another example, embodiments of the cement formulation disclosed herein may be used as a loss circulation material (LCM) treatment when excessive seepage or circulation loss problems are encountered. In such an instance, the cement formulation may be emplaced into the wellbore into the region where excessive fluid loss is occurring and allowed to set. Upon setting, the cement material may optionally be drilled through to continue drilling of the wellbore to total depth.

EXAMPLES

Example 1

Cement compositions were prepared and the effect of particulate silicas and ionic polymers on the resulting hardness of the final cement was assayed. Sample formulations are shown in Table 1, where AEROSIL® 300 is a fumed silica from Evonik Degussa Corporation (Piscataway, N.J.), and FLOSPERSE™ TS 3018 CS anionic polymeric dispersant from SNF S.A.S. (Andrezieux, FRANCE).

TABLE

Sample formulations for Example 1.

| Base | A | B | C |
|---|---|---|---|
| Monoethylene Glycol (mL) | 35 | 35 | 35 |
| MgO (g) | 10.5 | 10.5 | 10.5 |
| MgSO$_4$ (g) | 3.5 | 3.5 | 3.5 |
| Flosperse TS3018CS (g) | 0.0 | 0.75 | 1.5 |
| Aerosil 300 (g) | 0.5 | 0.8 | 0.5 |

Following sample preparation 5 mL of a selected formulation was combined with water and allowed to set for 16 hours at 80° C. Yield point (YP) and ultimate hardness were recorded and shown in Table 2 below.

TABLE 1

Hardness profile of various formulations shown in Example 1 after aging for 16 hours at 80° C.

| Sample | | | Hardness | |
|---|---|---|---|---|
| ref. | Base (5 mL) | Water (mL) | YP (g) | Ultimate (g) |
| 1 | A | 2.5 | — | o/s @0.8 mm |
| 2 | A | 5 | — | 4681 |
| 3 | A | 7.5 | 644 g @ 0.6 mm | 2548 |
| 4 | B | 2.5 | — | O/s @1 |
| 5 | B | 5 | 2542 @ 1.4 | 5026 |
| 6 | B | 7.5 | 863 @ 1.23 | 2438 |
| 7 | C | 2.5 | — | O/s @ 0.4 |
| 8 | C | 5 | — | O/s @ 9 |
| 9 | C | 7.5 | — | 983 |

Example 2

In the following example, the overall hardness of the compositions was studied as a function of added silica. Samples were formulated as in Table 1 using 35 mL monoethylene glycol, 10.5 g MgO, 3.5 g MgSO$_4$, from which 5 ml aliquots were taken and fumed silica or ionic polymer added as shown in Table 3. Final cement hardness values are also shown on Table 3 after aging at 80° C. for 16 hours.

TABLE 2

Sample Formulation for Example 2.

| AEROSIL ® 300 Fumed | Water | | |
|---|---|---|---|
| Silica Conc. (g) | 2.5 ml | 5 ml | 7.5 ml |
| 0 | >5000 g | 3950 g | 1590 g |
| 0.5 | >5000 g | 4681 g | 2548 g |
| 0.8 | >5000 g | >5000 g | 2438 g |
| 1.5 | >5000 g | 4268 g | 1939 g |
| 0.5 g AEROSIL ® 300 + 1.5 g FLOSPERSE ™ TS3018CS polymer | >5000 g | >5000 g | 983 g |

Example 3

In the following example, the spurt loss for a cement composition in accordance with embodiments disclosed herein was studied. The cement composition was formulated as shown in Table 3, where AEROSIL® COK 84 is a mixture of AEROSIL® 200 silica particles and aluminum oxide available from Evonik Industries (Piscataway, N.J.), and CARBOSPERSE™ K-7058D is a polyelectrolyte available from Lubrizol (Wickliffe, Ohio).

TABLE 3

Cement formulation for Example 3

| Base | E (w/w %) |
|---|---|
| Monoethylene Glycol | 71 |
| MgO | 19 |
| MgSO$_4$ | 6 |
| AEROSIL ® COK 84 | 1 |
| CARBOSPERSE ™ K-7058D | 3 |
| Density | 10.4 ppg |
| Specific Gravity | 1.25 |

In order to assay the setting time of cement compositions as a function of water, three samples were prepared by mixing formulation E at 1.5:1, 1:1, and 1:1.5 ratios of cement composition to water. Samples were mixed and incubated at 50° C. and the hardness profile was measured as a function of time. Results are illustrated in FIG. 1.

Hardness was measured using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 4 mm diameter, cylindrical, flat faced probe into the sample at a constant speed of 10 mm per minute. When the probe is in contact with the sample, a force is applied to the probe due to the resistance of the sample's structure until it fails, which is recorded via the load cell and computer software. As the probe travels through the sample, the force on the probe and the depth of penetration are measured. The load cell on this particular instrument has a maximum range of 5000 g and so samples that were found to give values greater than this were recorded as off scale or >5000 g.

Figure 2:
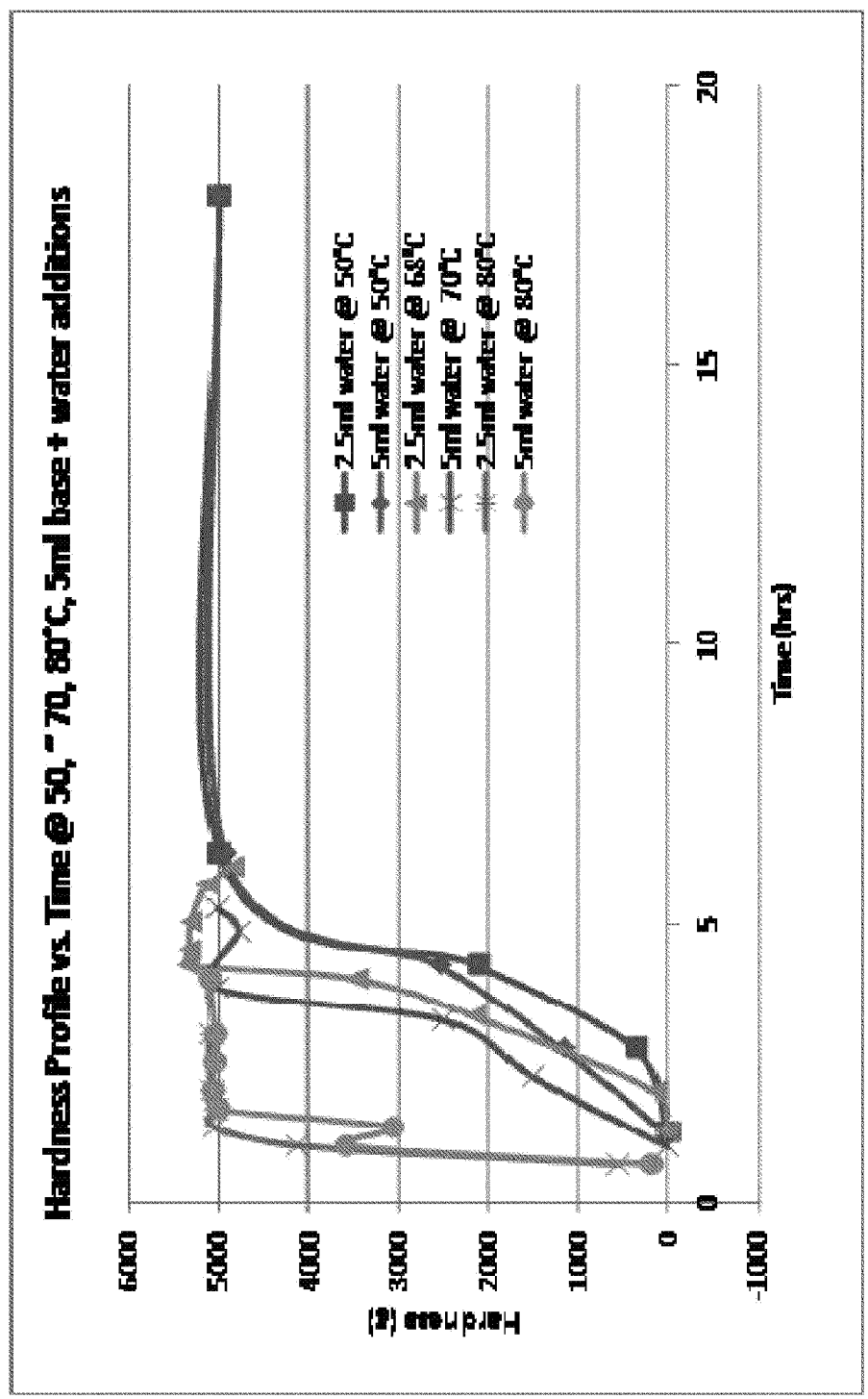
FIG. 2 is an illustration of the hardness profile as a function of applied water and temperature for cement compositions in accordance with embodiments described herein.

The effect of temperature on the setting time was also studied for a number of samples. In the series, 5 mL of formulation E was mixed with 2.5 mL or 5 mL of water and samples were placed at 50° C., 68° C., 70° C., and 80° C., respectively. Results are illustrated in FIG. 2.

Example 4

In the following example, the effect of the particulate silica and ionic polymer on the hardness of different base compositions and water compositions was assayed. Sample formulations are shown below in Table 5, where COK 84 is a mixture of AEROSIL® 200 silica particles and aluminum oxide available from Evonik Industries (Piscataway, N.J.), D66 is a silica flour available from Schlumberger LTD (Houston, Tex.), and CARBOSPERSE K-7058D is a polyelectrolyte available from Lubrizol (Wickliffe, Ohio).

TABLE 4

Sample formulations for Example 4.

| Base | F | G | H | I | J | K |
|---|---|---|---|---|---|---|
| monoethylene glycol (g) | 71 | 71 | 71 | 71 | 71 | 71 |
| MgO (g) | 19 | 19 | 19 | 19 | 19 | 19 |
| MgSO$_4$ (g) | 6 | 6 | 6 | 6 | 6 | 6 |
| D66 Silica (g) | — | 1 | — | — | — | 1 |
| AEROSIL ® COK 84 Silica (g) | — | — | 1 | — | 1 | — |
| CARBOSPERSE ™ K-7058D Polymer (g) | — | — | — | 3 | 3 | 3 |

Figure 3:
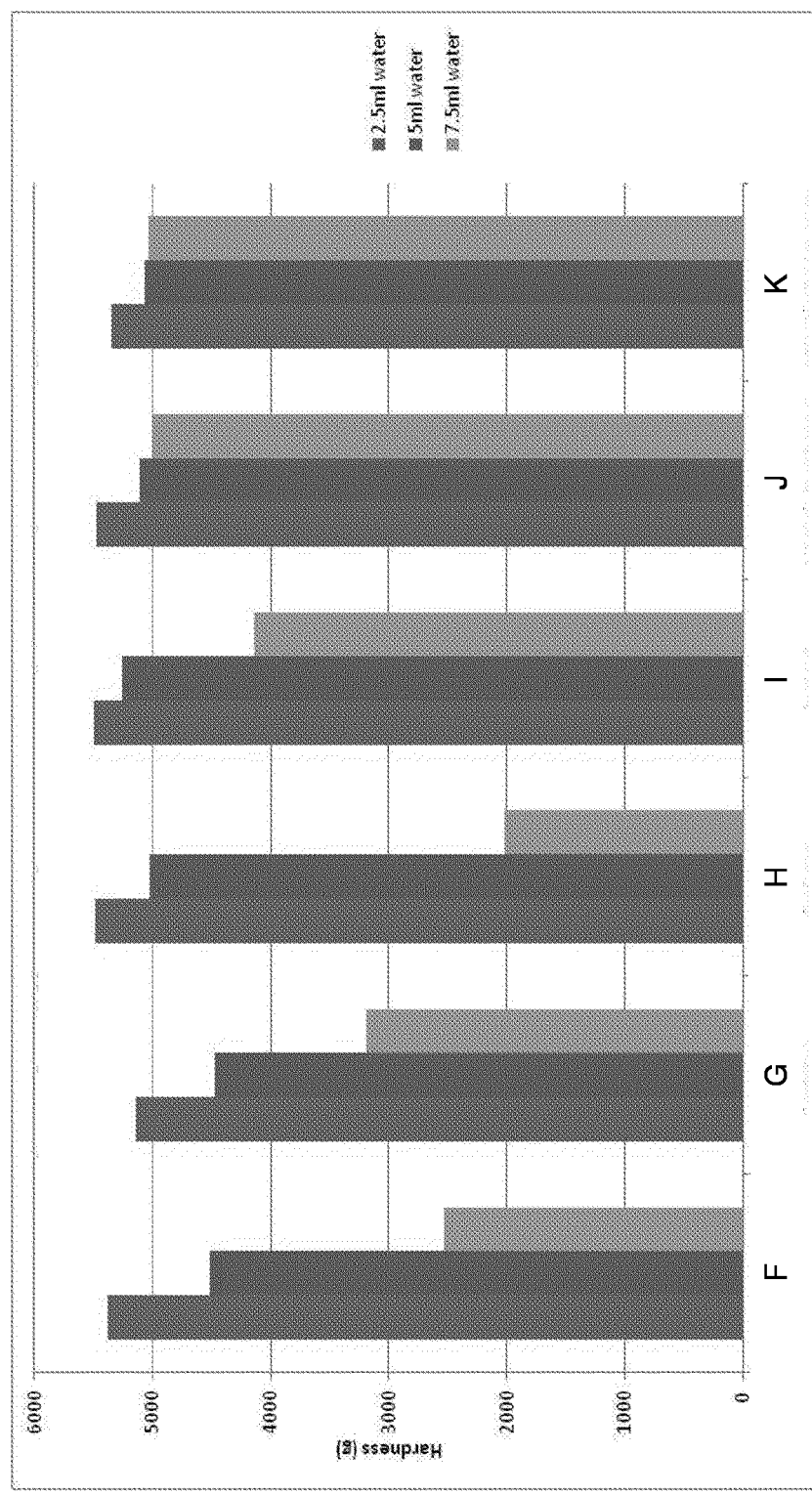
FIG. 3 is an illustration of the measured hardness as a function of component concentrations of cured cement compositions in accordance with the present disclosure.

Hardness of sample compositions was assayed by mixing 5 mL of each formulation with 2.5 mL, 5 mL, and 7.5 mL of water, respectively, and incubating the samples at 80° C. for 17 hours. Measurements were taken by using a Brookfield QTS-25 Texture Analysis Instrument as described above. Results are illustrated in FIG. 3. As indicated in the results, the use of particulate silica and ionic polymer increases the hardness of the resulting cement when the cement is formed at high water concentrations.

Example 5

In order to assay the performance of sample cementing compositions, sample formulations prepared according to Table 4 were applied to a simulated formation composed of large limestone chippings and pore water. Prior to sample application, the limestone chippings and water was packed into a pressure resistant stainless steel cell to leave a residual amount of water in the gaps between the chips.

Figure 4:
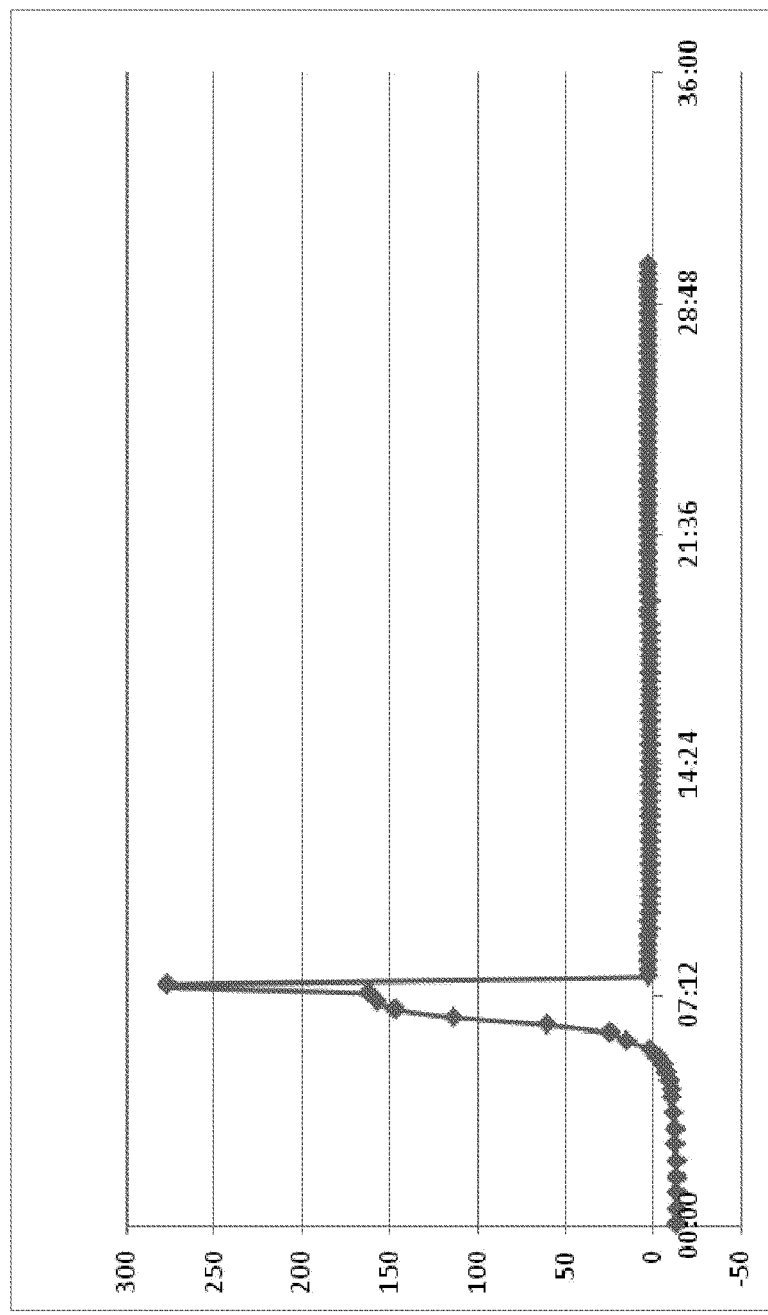
FIG. 4 illustrates the formation sealing properties of an embodiment of the present disclosure before curing.

In a first experiment, the sample composition was pumped at a rate of 10 ml a minute into the limestone column at 65° C. As illustrated in FIG. 4, after an initial resistance to flow, pressure reached approximately 280 psi before spurt loss, followed by a steady drip flow of liquid from the column. During the course of the experiment, the cement remained partially liquid and fully penetrated the limestone column.

Figure 5:
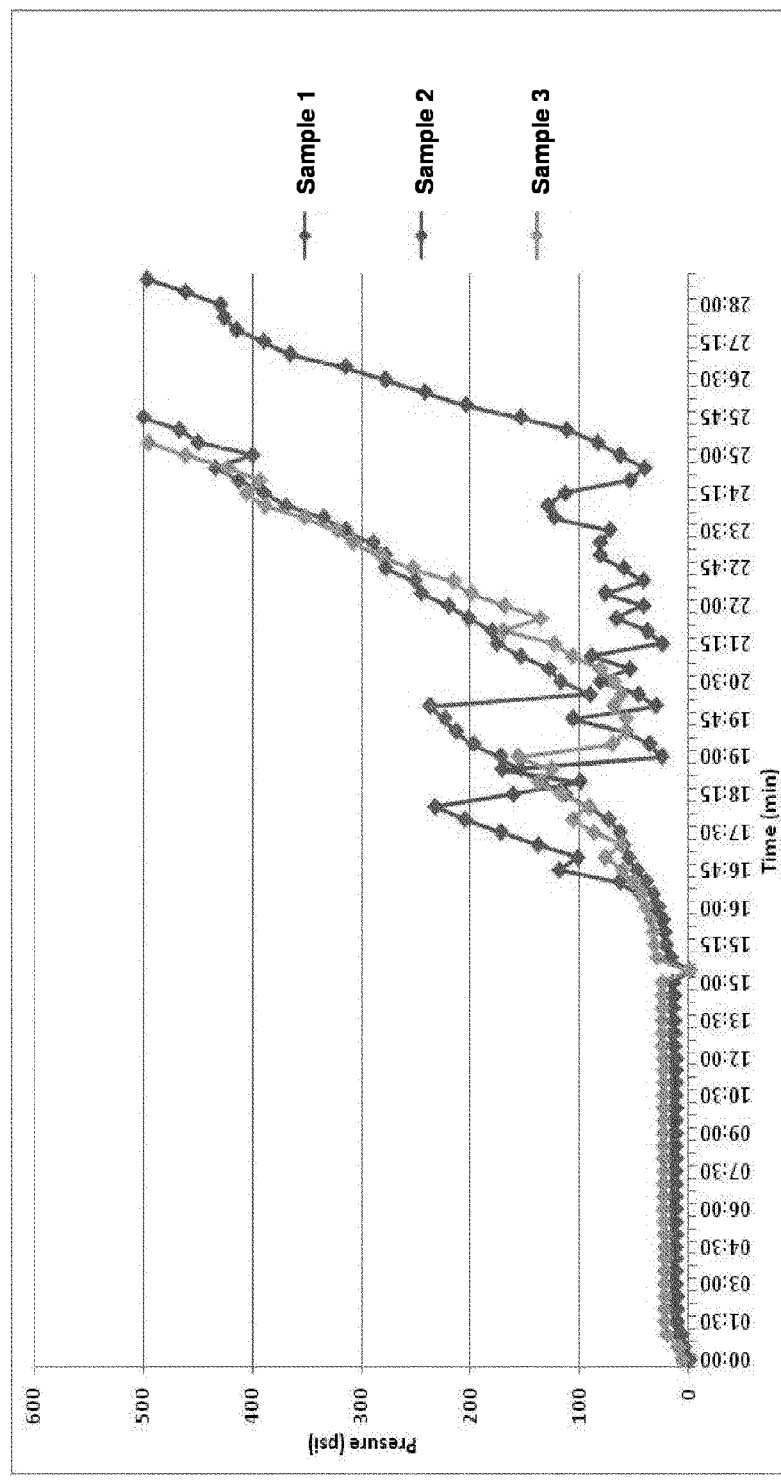
FIG. 5 illustrates the formation sealing properties of an embodiment of the present disclosure after curing.

In a second experiment, the sample and pressure chamber were prepared identically to the first experiment, however, pumping was suspended at 15 minutes to allow the sample composition to set after mixing with the water present in the column. Following a cure time of 1.5 to 2 hours, pumping was resumed. After an initial compression phase where cement and chips were being compacted, all three samples exceeded a maximum pressure of the instrument (>500 psi). Results are illustrated in FIG. 5, where Sample 1 is a cement composition as shown in Table 4; Sample 2 is a cement composition as shown in Table 4, but where the limestone column was prepared with seawater instead of fresh water; and Sample 3 is a cement composition prepared substantially as shown in Table 4, but excluding particulate silica.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Moreover, embodiments described herein may be practiced in the absence of any element that is not specifically disclosed herein.

What is claimed:

1. A cement composition comprising:
    a magnesium-based cement component present in the cement composition in an amount ranging from greater than 5 to 60 weight percent;
    an oil-immiscible solvent, wherein the cement composition comprises less than 15% by volume water; and
    one or more ionic polymers wherein the one or more ionic polymer is a copolymer or terpolymer comprising at least one of acrylic acid, itaconic acid, maleic acid, acrylamido-2-methyl-propane sulfonic acid, styrene sulfonic acid, and vinyl phosphonic acid.

2. The cement composition of claim 1, wherein the oil-immiscible solvent is one or more selected from a group consisting of ethylene glycol, propylene glycol, glycerol, diethylene glycol, triethylene glycol, 1,3-butanediol, and hexylene glycol.

3. The cement composition of claim 1, further comprising a particulate silica.

4. The cement composition of claim 1, further comprising polyvinylpyrrolidone.

5. The composition claim 1, wherein the composition is substantially free of surfactants.

6. The cement composition of claim 1, wherein the cement composition further comprises a retarder.

7. The cement composition of claim 6, wherein the retarder is one or more selected from a group consisting of organophosphates, amine phosphonic acids, lignosulfate salts, hydroxycarboxylic acids, carbohydrates, borax, sodium pentaborate, sodium tetraborate, boric acid, and proteins.

8. A cement composition comprising:
    a magnesium-based cement component present in the cement composition in an amount ranging from greater than 5 to 60 weight percent;
    an oil-immiscible solvent, wherein the cement composition comprises less than 15% by volume water; and
    a latent curing agent.

9. The cement composition of claim 8, wherein the latent curing agent is an encapsulated aqueous fluid.

10. The cement composition of claim 8, further comprising an ionomer.

11. A method for sealing a subterranean zone comprising:
    emplacing a cement composition comprising less than 15% by volume of water into a wellbore, the cement composition comprising:
    a magnesium-based cement component present in the cement composition in an amount ranging from greater than 5 to 60 weight percent,
    an oil-immiscible solvent; and one or more ionic polymers wherein the one or more ionic polymer is a copolymer or terpolymer comprising at least one of acrylic acid, itaconic acid, maleic acid, acrylamido-2-methyl-propane sulfonic acid, styrene sulfonic acid, and vinyl phosphonic acid;

contacting the cement composition with a formation water; and reacting the cement composition with the formation water to form a hardened cement.

12. The method of claim 11, wherein emplacing the cement composition comprises emplacing the cement composition into at least an interval of an annulus of the wellbore created by two concentric strings of pipe extending into the wellbore.

13. The method of claim 11, wherein the cement composition is suitable for spot cementing, plug cementing or squeeze cementing.

14. The method of claim 11, wherein the oil-immiscible solvent is one or more selected from a group consisting of ethylene glycol, propylene glycol, glycerol, diethylene glycol, triethylene glycol, 1,3-butanediol, ethanolamine, and hexylene glycol.

15. The method of claim 11, wherein the cement composition further comprises a particulate silica.

16. The method of claim 11, wherein the cement composition further comprises polyvinylpyrrolidone.

17. The method of claim 11, further comprising at least one of a preflush and an overflush with an aqueous fluid.

18. The method of claim 11, wherein the cement composition further comprises a retarder.

19. The method of claim 18, wherein the retarder is one or more selected from a group consisting of organophosphates, amine phosphonic acids, lignosulfate salts, hydroxycarboxylic acids, carbohydrates, borax, sodium pentaborate, sodium tetraborate, boric acid, and proteins.

20. A method for sealing a subterranean zone comprising:
emplacing a cement composition comprising less than 15% by volume of water into a wellbore, the cement composition comprising:
a magnesium based cement component;
an oil-immiscible solvent;
a latent curing agent;
releasing an aqueous fluid stored in the latent curing agent; and
reacting the cement composition with the aqueous fluid released from the latent curing agent to form a hardened cement.

21. The method of claim 20, wherein the latent curing agent is an aqueous fluid encapsulated in an organic coating.

22. The method of claim 21, wherein releasing the aqueous fluid stored in the latent curing agent comprises physical disruption of the organic coating.

23. The method of claim 20, wherein the latent curing agent is an aqueous fluid contained within an inorganic material.

24. The method of claim 20, wherein the cement composition further comprises particulate silica.

25. The method of claim 20, wherein the cement composition further comprises an ionic polymer or polyvinylpyrrolidone.

26. The method of claim 20, wherein the cement composition further comprises a retarder.

27. The method of claim 26, wherein the retarder is one or more selected from a group consisting of organophosphates, amine phosphonic acids, lignosulfate salts, hydroxycarboxylic acids, carbohydrates, borax, sodium pentaborate, sodium tetraborate, boric acid, and proteins.

* * * * *